United States Patent
Matsugashita

(10) Patent No.: US 9,686,286 B2
(45) Date of Patent: Jun. 20, 2017

(54) AUTHORITY TRANSFER SYSTEM, AUTHORITY TRANSFER METHOD, INFORMATION PROCESSING APPARATUS, AND RECORDING MEDIUM

(71) Applicant: CANON KABUSHIKI KAISHA, Tokyo (JP)

(72) Inventor: Hayato Matsugashita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 14/268,979

(22) Filed: May 2, 2014

(65) Prior Publication Data

US 2014/0245402 A1 Aug. 28, 2014

Related U.S. Application Data

(63) Continuation of application No. 13/168,698, filed on Jun. 24, 2011, now abandoned.

(30) Foreign Application Priority Data

Jun. 28, 2010 (JP) .................................. 2010-146649

(51) Int. Cl.
*H04L 29/06* (2006.01)
*G06F 21/60* (2013.01)
*G06F 3/12* (2006.01)

(52) U.S. Cl.
CPC ............ *H04L 63/10* (2013.01); *G06F 21/606* (2013.01); *G06F 21/608* (2013.01); *G06F 3/1238* (2013.01)

(58) Field of Classification Search
CPC ....... H04L 29/06; H04L 63/10; G06F 21/606; G06F 21/608; G06F 3/1238
USPC ............................................................ 726/4
See application file for complete search history.

(56) References Cited

U.S. PATENT DOCUMENTS

| | | | |
|---|---|---|---|
| 8,630,006 B2* | 1/2014 | Kouno | G06F 3/12 358/1.15 |
| 8,656,475 B2* | 2/2014 | Eom | G06F 21/335 709/229 |
| 8,844,015 B2* | 9/2014 | Pendergrass | G06F 21/33 726/10 |
| 8,875,245 B2* | 10/2014 | Tamura | H04L 63/0884 705/52 |
| 8,959,581 B2* | 2/2015 | Tanizawa | H04L 63/08 713/155 |
| 2004/0138910 A1* | 7/2004 | Matsuno | G06Q 20/3552 705/51 |
| 2008/0104675 A1* | 5/2008 | Kusano | H04L 9/3213 726/4 |

(Continued)

FOREIGN PATENT DOCUMENTS

| | | |
|---|---|---|
| JP | 2005-050268 A | 2/2005 |
| JP | 2006-134319 A | 5/2006 |

(Continued)

*Primary Examiner* — Krista Zele
*Assistant Examiner* — Tariq Najee-Ullah
(74) *Attorney, Agent, or Firm* — Canon U.S.A., Inc. IP Division

(57) ABSTRACT

To prevent a transfer of an authority from being useless as much as possible, an authority transfer unit includes a decision unit for making a decision that an authority of a user with respect to a management unit is transferred to a processing request unit.

2 Claims, 13 Drawing Sheets

(56) References Cited

U.S. PATENT DOCUMENTS

| | | | |
|---|---|---|---|
| 2009/0113538 A1* | 4/2009 | Eom | G06F 21/335 |
| | | | 726/12 |
| 2010/0125892 A1* | 5/2010 | Tanizawa | H04L 63/08 |
| | | | 726/2 |
| 2011/0216357 A1* | 9/2011 | Kouno | G06F 3/12 |
| | | | 358/1.15 |
| 2012/0102548 A1* | 4/2012 | Tamura | G06F 21/31 |
| | | | 726/4 |
| 2012/0268770 A1 | 10/2012 | Fukuda | |
| 2013/0198828 A1* | 8/2013 | Pendergrass | G06F 21/33 |
| | | | 726/10 |

FOREIGN PATENT DOCUMENTS

| | | |
|---|---|---|
| JP | 2006-221506 A | 8/2006 |
| JP | 2007-206810 A | 8/2007 |
| JP | 2008-117069 A | 5/2008 |

\* cited by examiner

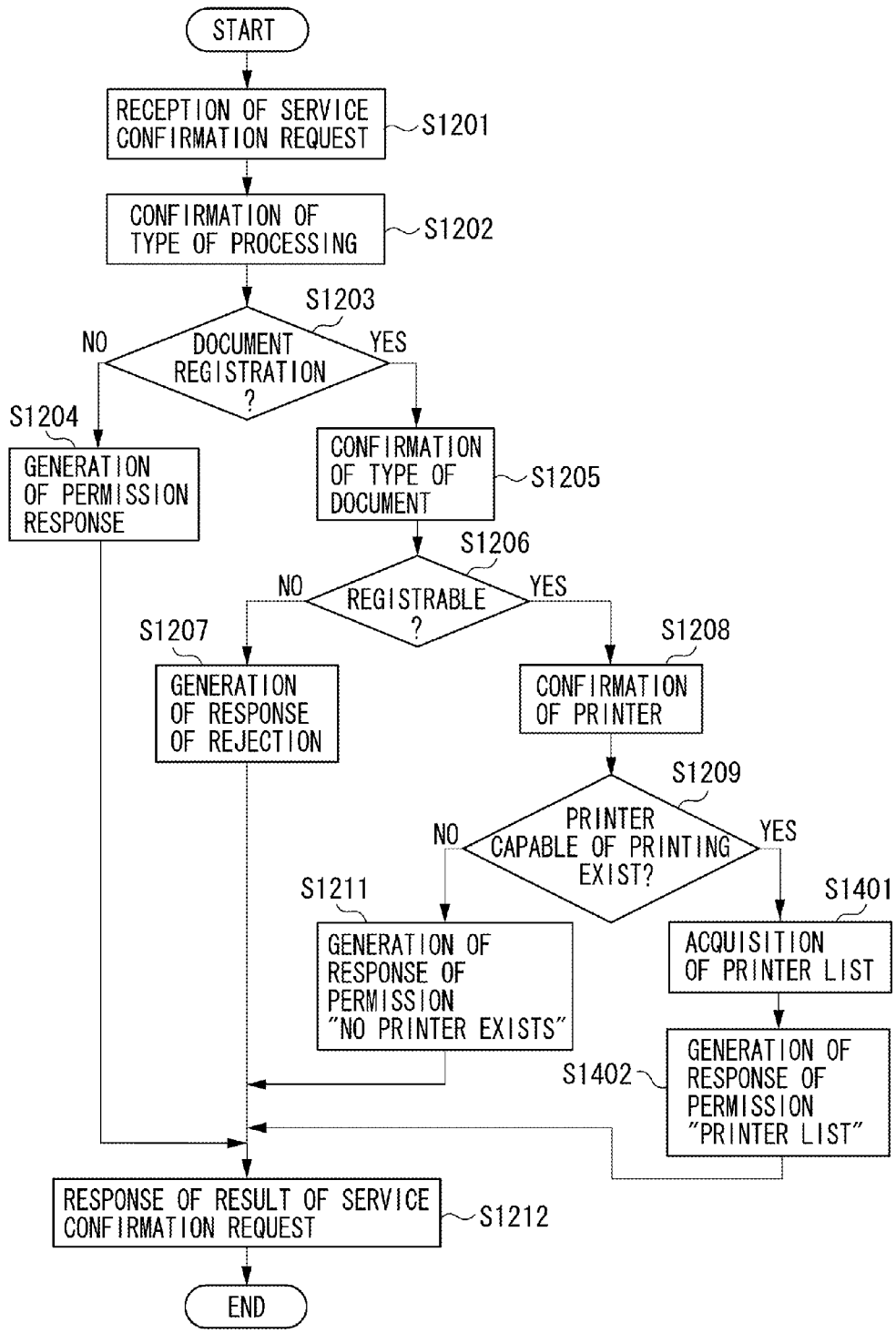

AUTHORITY TRANSFER SYSTEM, AUTHORITY TRANSFER METHOD, INFORMATION PROCESSING APPARATUS, AND RECORDING MEDIUM

CROSS REFERENCE TO RELATED APPLICATIONS

The present application is a Continuation of U.S. patent application Ser. No. 13/168,698 filed Jun. 24, 2011, which claims the benefit of priority from Japanese Patent Application No. 2010-146649 filed Jun. 28, 2010, each of which is hereby incorporated by reference herein in their entirety.

BACKGROUND OF THE INVENTION

Field of the Invention

The present invention relates to an authority transfer system, an authority transfer method, an information processing apparatus, and a recording medium.

Description of the Related Art

Conventionally, a method for transferring an access authority for accessing to a resource protected for a certain user to another subject has been discussed. For example, a method in a case where the subject of an authority transfer destination is another user is discussed in Japanese Patent Laid-open No. 2006-221506. In Japanese Patent Laid-open No. 2006-221506, a user of an authority transfer source of an authority preliminarily receives an authentication to a target object that protects the resource. Then, an authentication ticket for transferring the authority is issued. The authority is transferred to the user of the authority transfer destination of the authority, thereby achieving the transfer of the authority.

Further, in the Internet Engineering Task Force (IETF), a protocol used for transferring an access authority to the protected resource of the user, to the other subject as a portion of the OAuth Web Resource Authorization Profiles (WRAP), that is a definition of the authorization with respect to the protection resource of the Web, is discussed.

In the conventional authority transfer method, an access to the resource of the subject who received the authority is rejected after the authority is transferred thereto and, as a result thereof, such a case may occur that the transfer of the authority is useless.

For example, there may be such a case that, in a case where a service for generating a document (i.e., a document generation service) and a service for printing the document upon receiving a registration of the document (i.e., a print management service) cooperates to each other, the authority of the user using these services is transferred. In a case where the document generation service registers the document to the print management service, the authority for registering the document that the user has is required to be transferred to the document generation service.

At that time, in the conventional technique, the transfer of the authority is confirmed to the user before the print management service registers the document, and a token for certificating the transfer of the authority is issued. The document generation service registers the document to the print management service by using the issued token. However, in the print management service, there may be a case that the registration is rejected for the reason that the document is formed in an unprintable format.

There may be no printer that can perform printing with the transferred authority of the user. As a result thereof, there may be a problem that the transfer of the authority from the print management service to the document generation service is useless.

SUMMARY OF THE INVENTION

According to an aspect of the present invention, an authority transfer system includes a processing request unit, an authority transfer unit, and a management unit, wherein the processing request unit includes a generation unit configured to, in response to a request of processing from a user apparatus operated by a user, generate a request containing processing information indicating contents of the processing, wherein the authority transfer unit includes a transmission unit configured to receive the request generated by the generation unit and transmit the request containing the processing information to the management unit based on the request, wherein the management unit includes a determination unit configured to receive the request transmitted by the transmission unit and determine whether or not the processing is executable by the management unit based on the processing information contained in the request, and wherein the authority transfer unit includes a decision unit configured to, in a case where the determination unit determines the processing is executable, decide that an authority of the user with respect to the management unit is to be transferred to the processing request unit.

According to another aspect of the present invention, an authority transfer method executed by an information processing apparatus includes generating a request containing processing information indicating contents of the processing in response to a request of processing from a user apparatus operated by a user, transmitting the request generated by the generation processing to the authority transfer apparatus that decides whether or not an authority of the user with respect to the management apparatus as the requesting destination of the processing is transferred to the information processing apparatus, and controlling to receive decision information indicating a result of deciding whether to transmit the authority from the authority transfer apparatus based on a result whether or not the processing is executable is confirmed to the management apparatus and request the processing to the management apparatus according to the decision information.

According to the present invention, a state that the transfer of the authority becomes useless can be avoided as much as possible.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 illustrates an example of a flow chart of confirmation processing.

DESCRIPTION OF THE EMBODIMENTS

Various exemplary embodiments, features, and aspects of the invention will be described in detail below with reference to the drawings.

Figure 1:
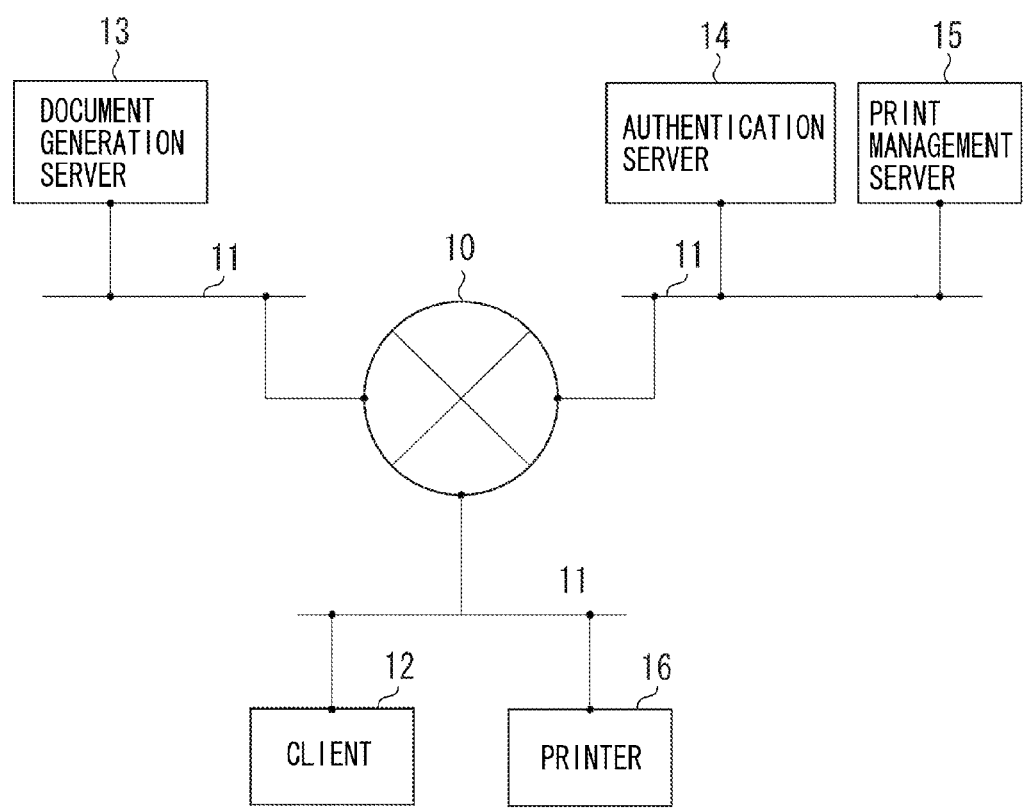
FIG. 1 illustrates an example of a configuration of an authority transfer system.

FIG. 1 illustrates an example of a configuration of an authority transfer system according to the present exemplary embodiment. In the present exemplary embodiment, a case where the World Wide Web (WWW) system is employed as the authority transfer system is used for an example. In the authority transfer system, a plurality of devices are connected to each other via a Wide Area Network (WAN) 10 as an example of an external network and a Local Area Network (LAN) 11 as an example of an internal network.

A client 12 is an example of an information processing apparatus (i.e., a computer), and is a client terminal having a WWW referable Web browser. The client 12 issues a Web request (i.e., a request) to each of a document generation server 13, an authentication server 14, a print management server 15, and the like via the LAN 11 and the WAN 10.

The document generation server 13, the authentication server 14, and the print management server 15 are examples of the information processing apparatus which receives a request indicating a request for processing from the client 12 as the Web server. The document generation server 13 generates a document (i.e., document information) according to the request from the client 12.

The authentication server 14 performs an authentication according to the request from the client 12 (i.e., checks a qualification of the user operating the client 12). The print management server 15 manages printing of a designated document by a designated printer 16 according to the request from the client 12. The printer 16 is an example of the image forming apparatus that prints a document. The printer 16 is registered to and thus managed by the print management server 15.

Figure 2:
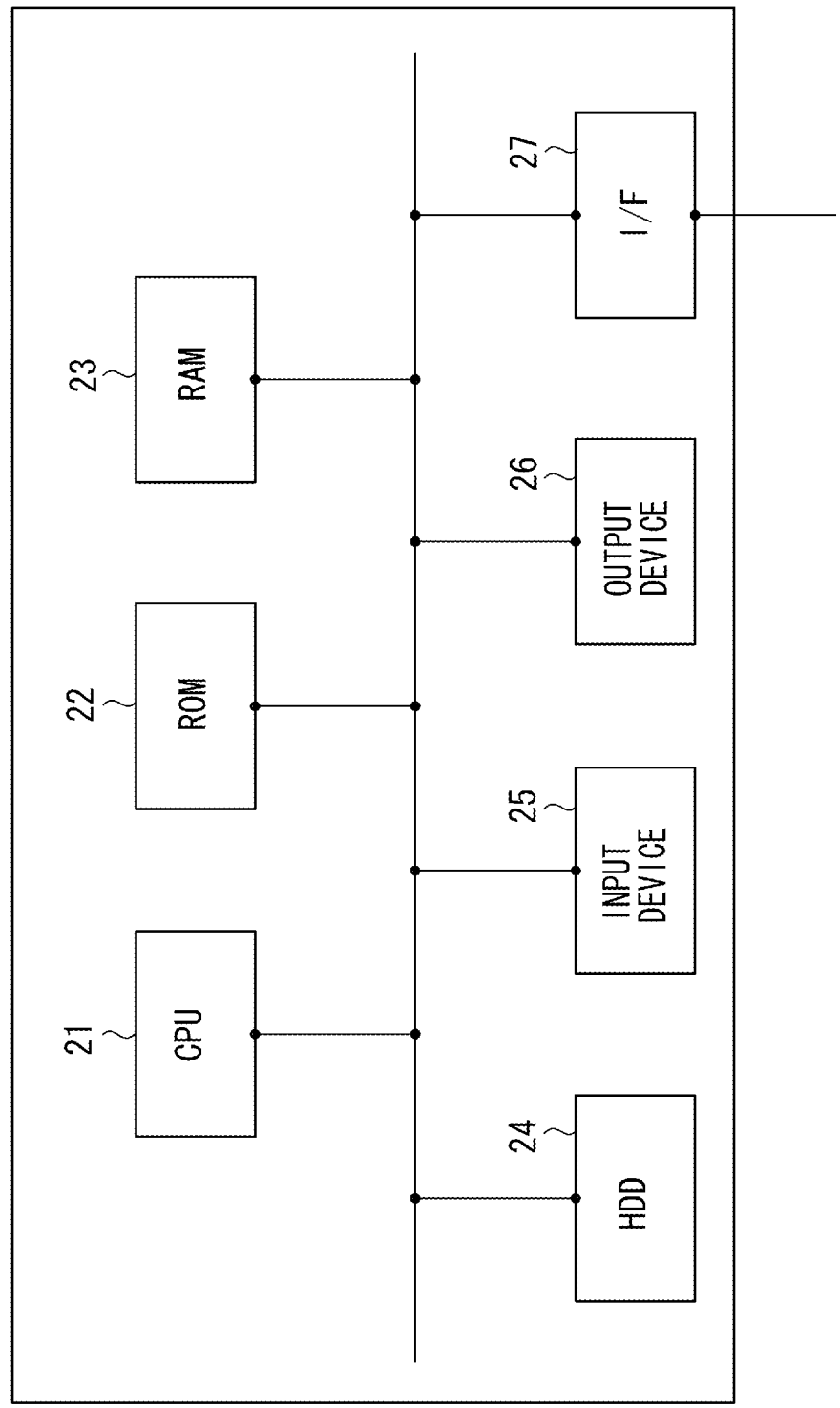
FIG. 2 illustrates an example of a configuration of hardware of an information processing apparatus.

FIG. 2 illustrates an example of a hardware configuration of the information processing apparatus employable as the client 12, the document generation server 13, the authentication server 14, and the print management server 15. A central processing unit (CPU) 21 directly or indirectly controls devices (e.g., a Read Only Memory (ROM) 22 and a Random Access Memory (RAM) 23) connected to each other via the internal bus, thereby executing various programs.

The ROM 22 stores a basic input output system (BIOS) program or the like. The RAM 23 is an example of a direct storage device and is used as a work area of the CPU 21. The RAM 23 is used as a temporary storage medium of the various software modules.

A hard disk drive (HDD) 24 is an example of an indirect storage device and stores an operating system (OS) as basic software, and a program of software modules. The HDD 24 may be a solid state drive (SSD) or the like. An input device 25 is, for example, a keyboard or a pointing device. An output device 26 is, for example, a display. An interface (I/F) 27 controls data communications with devices connected to the LAN 11 and WAN 10.

In the hardware, after a start up of the information processing apparatus, the CPU 21 executes the BIOS program to load an OS program from the HDD 24 to the RAM 23 in an executable manner. The CPU 21 loads a program of various software modules from the HDD 24 to the RAM 23, as needed, in an executable manner according to an operation of the OS.

Various software modules operate according to cooperation with the devices such as the CPU 21. In other words, execution of processing by the CPU 21 according to a procedure of the program stored in the HDD 24 realizes processing of functions in the information processing apparatus and according to the flow chart to be described below.

The I/F 27 is connected to the LAN 11, controlled by the CPU 21 according to the operation of the OS, and transmits and receives a request between the below described service units held by each information processing apparatus. The I/F 27 is connected to the WAN 10 via the LAN 11, controlled by the CPU 21 according to the operation of the OS, and enables communications in the WWW system.

Figure 3:
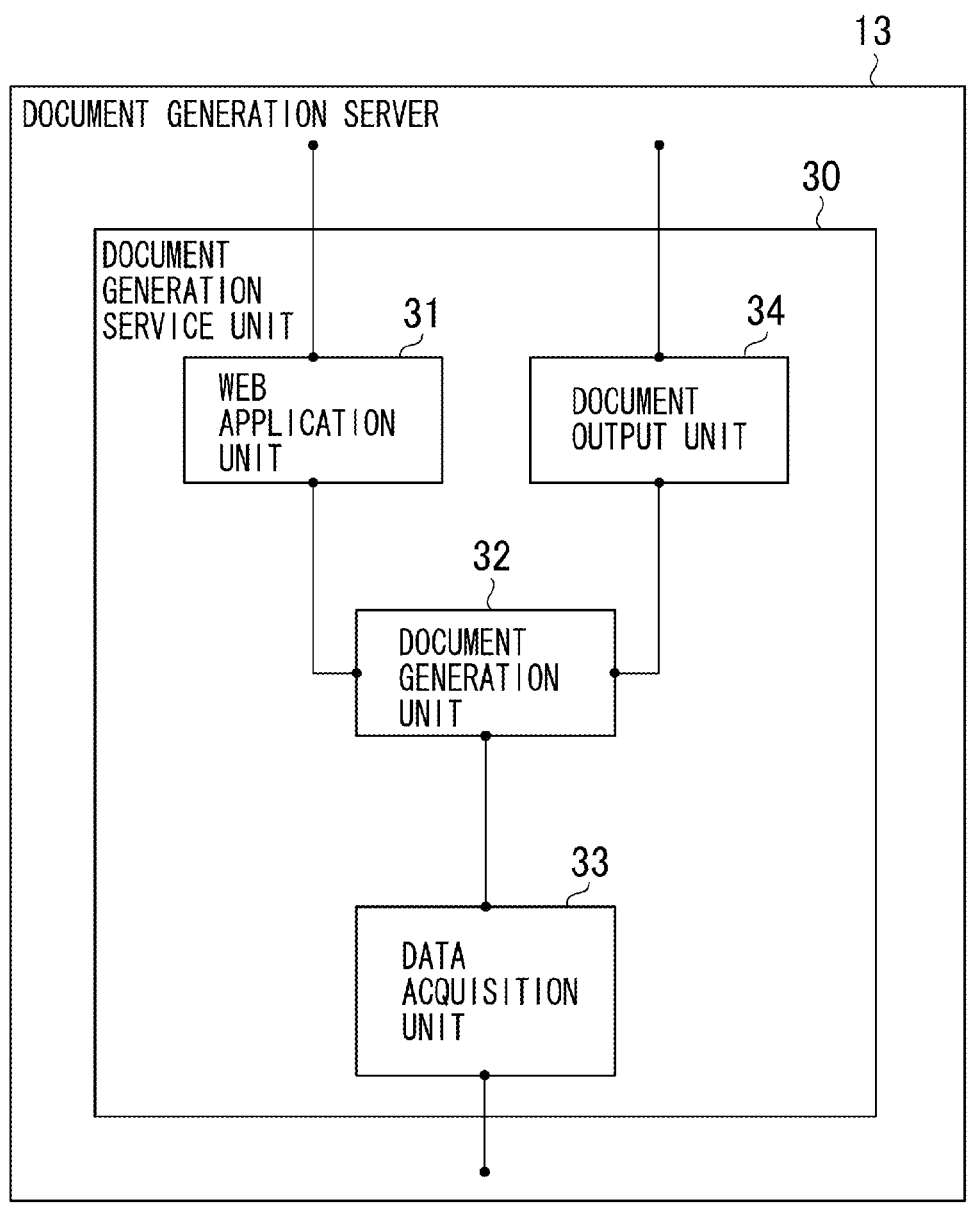
FIG. 3 illustrates an example of a configuration of a document generation service unit.

FIG. 3 illustrates an example of a configuration of a document generation service unit 30 operating in the document generation server 13. The document generation service unit 30 is an example of a processing request unit and includes a Web application unit 31, a document generation unit 32, a data acquisition unit 33, and a document output unit 34.

The Web application unit 31 includes a Web interface that receives the request from the client 12. The Web application unit 31 generates a screen (i.e., a document generation screen) for requesting generation of a document in response to the request from the Web browser held by the client 12.

In a case where the document generation unit 32 determines that the document generation request generated via the document generation screen in the client 12 is received by the Web application unit 31, the document generation unit 32 generates a document. At this time, the document generation unit 32 generates a document according to a pre-set logic. Data thereof is acquired from the other service unit (not illustrated) via the data acquisition unit 33, as needed.

The generated document is stored in a file system (not illustrated) and managed. In a case where the Web application unit 31 determines that the document is generated, the Web application unit 31 generates a screen for requesting an output of the document (i.e., a document output screen) to transmit it to the client 12.

In a case where the Web application unit 31 receives the document output request generated via the document output screen in the client 12, the Web application unit 31 outputs thus generated document to the other service unit via the document generation unit 32 and the document output unit 34.

The Web application unit 31 may generate a screen for requesting the generation and the outputting of the document (i.e., a document generation and output screen) in response to the request from the client 12. In this case, in a case where the Web application unit 31 receives the document generation and output request generated via the document generation and output screen in the client 12, the Web application unit 31 outputs the document generated by the document generation unit 32 to the other service unit via the document output unit 34.

Figure 4:
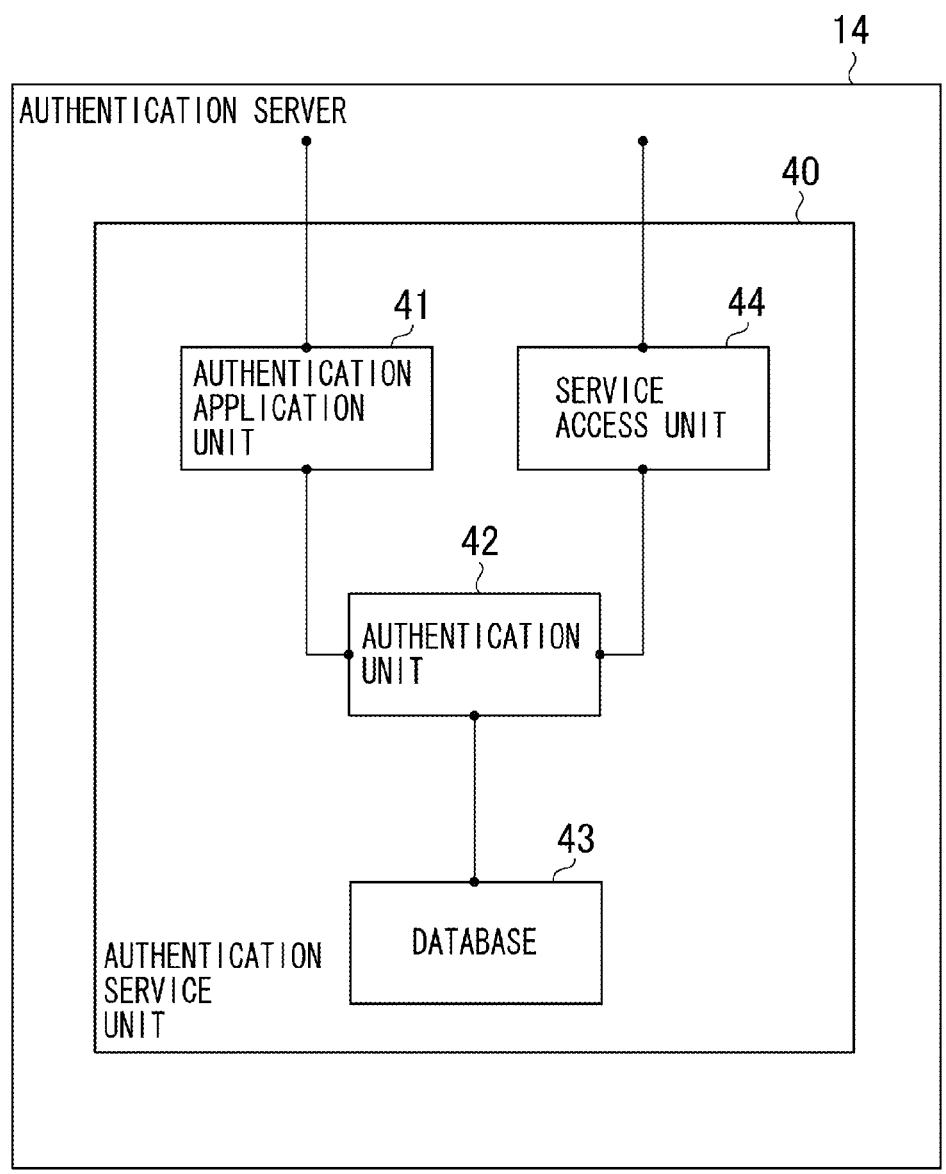
FIG. 4 illustrates an example of a configuration of an authentication service unit.

FIG. 4 illustrates an example of a configuration of an authentication service unit 40 operating in the authentication server 14. The authentication service unit 40 is an example of an authority transfer unit and includes an authentication application unit 41, an authentication unit 42, a database 43, and a service access unit 44.

The authentication application unit 41 includes a Web interface that receives a request from the client 12. The authentication application unit 41 generates an authentication screen in response to a Web request from the Web browser of the client 12.

In a case where the authentication unit 42 determines that the authentication request generated via the authentication screen is received by the authentication application unit 41 in the client 12, the authentication unit 42 performs authentication processing. At that time, for example, in a case where the authentication unit 42 determines that the authentication is successful, the authentication unit 42 generates an authentication token, and the authentication application unit 41 transmits the authentication token generated by the authentication unit 42 to the client 12 via the authentication application unit 41.

The authentication unit 42 performs authentication processing according to a pre-set logic, however, at this time, the authentication unit 42 accesses to the database 43 to perform matching with the preliminary registered user authentication information. For example, the authentication unit 42 performs matching between a combination of a user identifier (ID) included in the authentication request for identifying the user and a password as an example of secret information and the user authentication information to determine success or failure of the authentication.

In the present exemplary embodiment, as the authentication method, the authentication unit 42 acquires information of the user ID and the password contained in the authentication request from the client 12, and performs matching with the preliminary registered user authentication information.

However, the authentication method of the present exemplary embodiment is not limited to the above described authentication method. Examples of the other authentication method may include a method that the authentication is performed by confirming a certificate and a method that the authentication is performed by confirming user's biological information.

The service access unit 44 receives a request from the other service units as well as transmits a request to the other service units. Examples of the request received from the other service units include a token acquisition request for requesting an acquisition of a token that certificates a transfer of an authority in order to perform the requested processing (i.e., an authority transfer) and a token confirmation request for confirming validity of the token.

An example of the request to be transmitted to the other service units includes a service confirmation request transmitted in a case where a confirmation item to the other service units is included in the token acquisition request. In a case where the authentication method is a reverse proxy method, the service access unit 44 performs handling of the authentication as an entrance of the other service units and calls the other Web application according to a result of the authentication. The request received by the service access unit 44 is mainly processed by the authentication unit 42. A detailed description thereof is given below.

Figure 5:
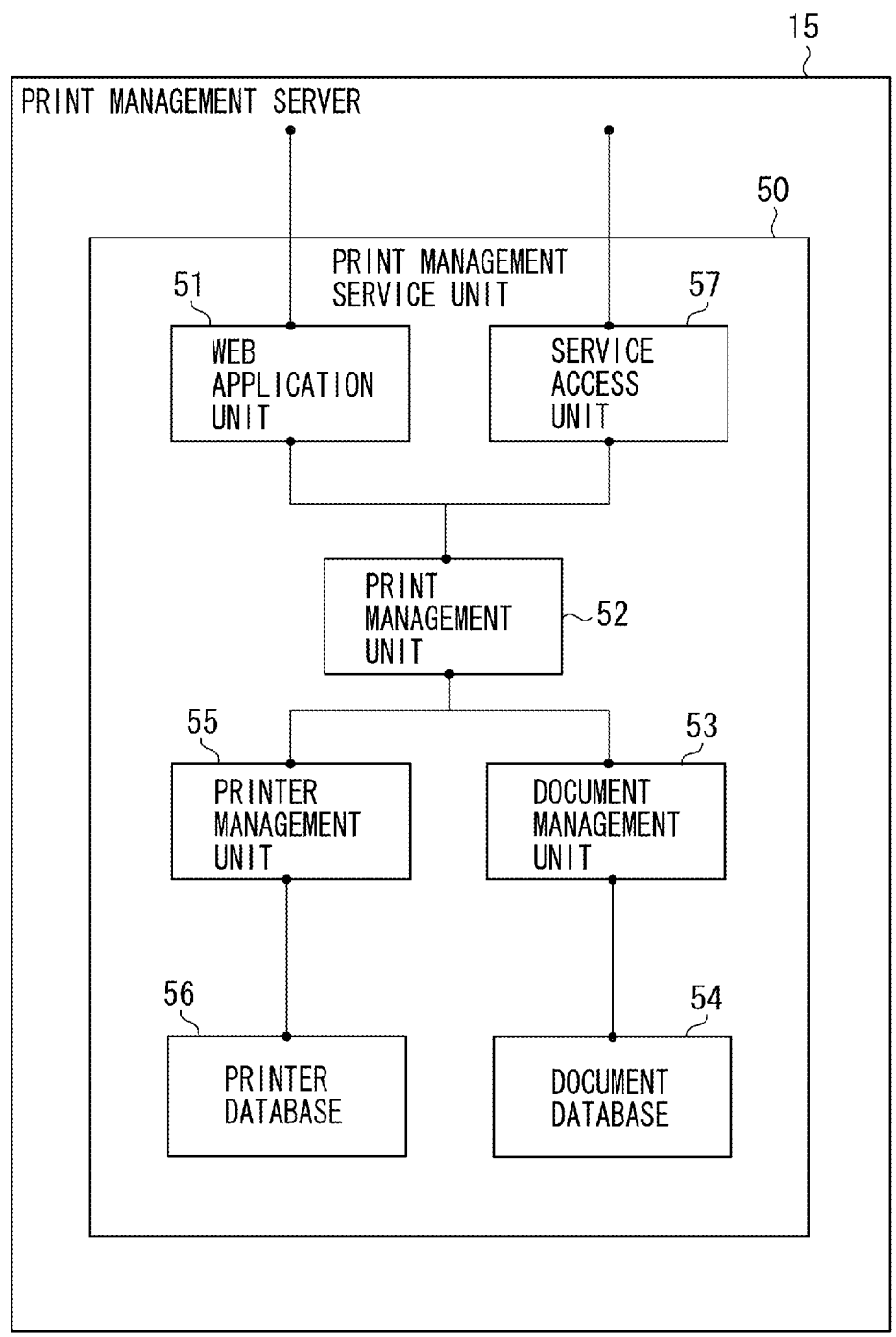
FIG. 5 illustrates an example of a configuration of a print management service unit.

FIG. 5 illustrates an example of a configuration of a print management service unit 50 operating in the print management server 15. The print management service unit 50 is an example of a management unit and includes a Web application unit 51, a print management unit 52, a document management unit 53, a document database 54, a printer management unit 55, a printer database 56, and a service access unit 57.

The Web application unit 51 includes a Web interface for receiving a request from the client 12. The Web application unit 51 generates a print instruction screen for requesting printing of a document designated by the designated printer 16 in response to a request from the Web browser included in the client 12.

At that time, in a case where the authentication method is a reverse proxy method, the Web application unit 51 does not directly receive the request from the client 12 but receives the request with the user information authenticated by the authentication service unit 40 being added, from the authentication service unit 40.

For example, in a case where the authentication method is an agent method, an authentication agent is added-in to the Web application unit 51 and the request from the client 12 is received by the authentication agent to be transmitted to the authentication service unit 40. When the authentication is successful, the authentication service unit 40 transmits the request with the authenticated user information being added to the Web application unit 51 via the authentication agent.

The Web application unit 51 transmits the user information to the print management unit 52 to acquire information of the printer and the document when the Web application unit 51 generates the print instruction screen. At this time, the print management unit 52 acquires printer information via the printer management unit 55 and acquires document information via the document management unit 53, respectively.

The printer management unit 55 acquires the printer information managed by the printer database 56. At that time, the printer management unit 55 extracts only printer information referable according to authority information of the user managed by the printer database 56, and then responds to the print management unit 52. The document management unit 53 acquires the document information managed by the document database 54. At that time, the document management unit 53 extracts only document information referable according to authority information of the user managed by the document database 54, and then responds to the print management unit 52.

In a case where the print management unit 52 determines that the print request generated via the print instruction screen is received by the Web application unit 51 in the client 12, the print management unit 52 instructs the designated printer to perform print processing. Examples of the print processing include a case that the print management unit 52 instructs pull printing to the designated printer via the Web browser of the client 12, and a case that the user directly instructs pull printing by using the designated printer. The designated printer issues a request to the document management unit 53 according to the instruction of the pull printing, and obtains a document to execute the printing.

The service access unit 57 receives a request from each of the other service units as well as transmits a request to each of the other service units. Examples of the request received from the other service units include a document registration request for receiving a document registration and a service confirmation request for confirming the success or the failure of the processing requested by the client 12 before the execution of the authority transfer. An example of the request to be transmitted to the other service units includes a token confirmation request. The request received by the service access unit 57 is mainly processed by the print management unit 52. A detailed description thereof is made below.

Figure 6:
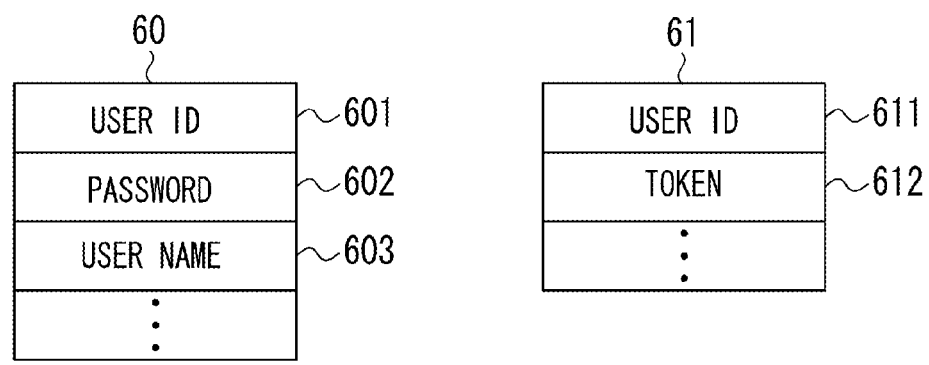
FIG. 6 illustrates examples of user authentication information and user token information.

FIG. 6 illustrates an example of user authentication information and user token information managed by the database 43.

User authentication information 60 includes information of a user ID 601 capable of identifying a user, a password 602 as secret information, and a user name 603 as a display name of the user. User token information 61 includes information of a user ID 611 capable of identifying the user and a token 612 indicating that the user is authenticated. The user authentication information 60 and the user token information 61 are related to each other by the user IDs 601 and 611. In the user authentication information 60, information of the user ID 601 and the user name 603, i.e., information except for information of the password 602, are referred to as user information, as necessary.

Figure 7:
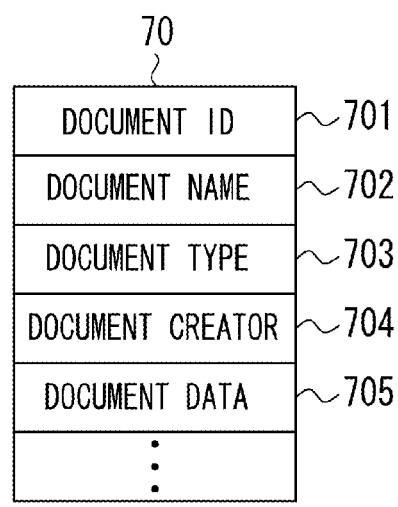
FIG. 7 illustrates an example of document information.

FIG. 7 illustrates an example of document information managed by the document database 54.

The document information 70 includes information of a document ID 701 capable of identifying a document, a document name 702 as a display name of the document, a document type 703 capable of identifying a format of the document, a document creator 704 as the user ID of the creator of the document, and document data 705. The document data 705 may be configured so as to store the document data in a binary format. Alternatively, the document data 705 may be configured to be stored in the other area and to store information indicating the pass of the storage location thereof.

Figure 8:
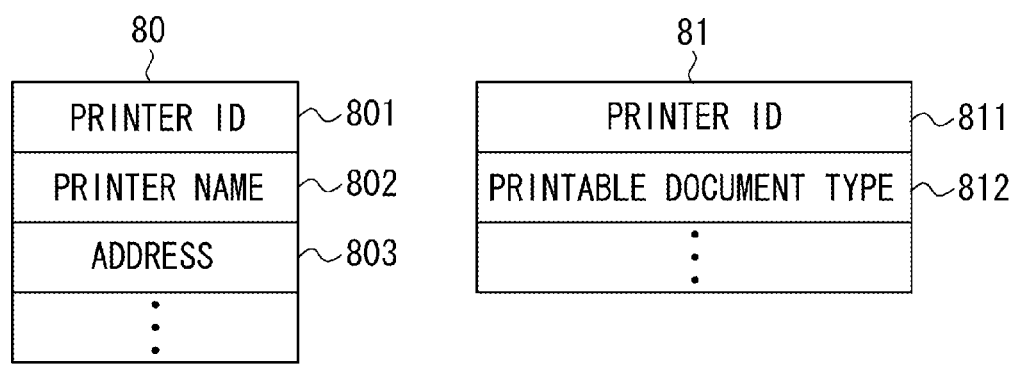
FIG. 8 illustrates examples of printer information and printer ability information.

FIG. 8 illustrates an example of printer information and printer ability information managed by the printer database 56.

The printer information 80 includes information of a printer ID 801 capable of identifying a printer, a printer name 802 as a display name of the printer, and an address 803 representing an address of the printer. The printer ability information 81 includes information of a printer ID 811 capable of identifying a printer, and a printable document type 812 representing a type of a format of a document printable by the printer. The printable document type 812 is an example of an ability of the printer. The printer information 80 and the printer ability information 81 are related to each other through the printer IDs 801 and 811.

Figure 9:
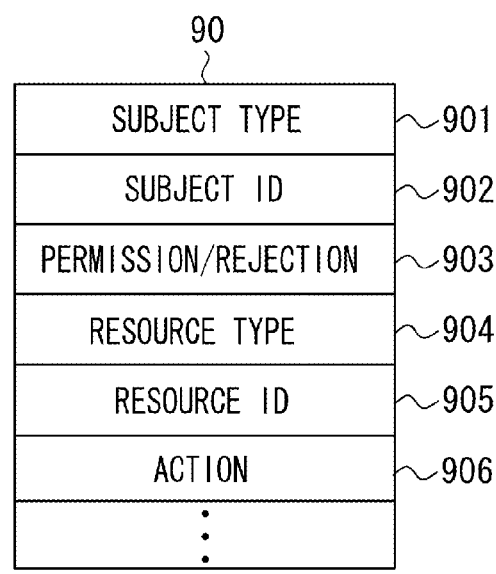
FIG. 9 illustrates an example of authority information.

FIG. 9 illustrates an example of authority information managed by the document database 54 and the printer database 56. Authority information 90 stores authority of the user for the printer information and the document information. The authority information 90 includes information of a subject type 901, a subject ID 902, a permission/rejection 903, a resource type 904, a resource ID 905, and an action 906.

For example, to shows the authority of a user referable to a certain printer, the following information is stored in the authority information 90. The subject type 901 stores information indicating a user, the subject ID 902 stores information of the user ID 601, and the permission/rejection 903 stores information of permission, respectively. Further, the resource type 904 stores information indicating a printer, the resource ID 905 stores information of the printer ID 801, and the action 906 stores information indicating reference, respectively.

Figure 10:
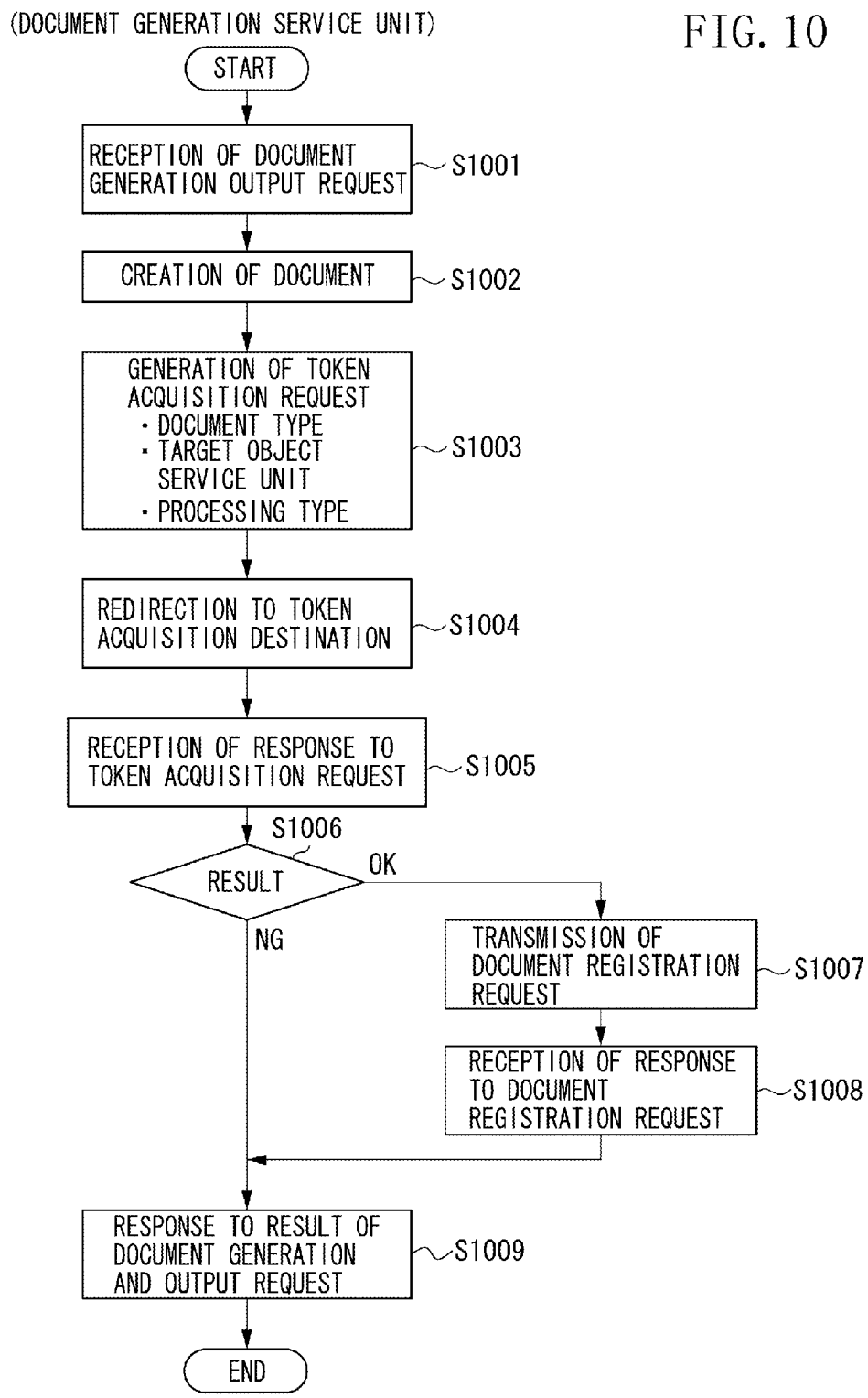
FIG. 10 illustrates an example of a flow chart of document generation and output processing.

Now, processing performed by each of the service units of the present exemplary embodiment is described below. FIG. 10 illustrates an example of a flow chart of processing performed in a case where the document generation service unit 30 receives a document generation and output request (i.e., a document generation and output processing).

In step S1001, the document generation service unit 30 receives the document generation and output request. In step S1002, the document generation service unit 30 generates a document according to a pre-set logic. In step S1003, the document generation service unit 30 subsequently generates a token acquisition request for requesting acquisition of a token for certificating that the authority for registering a document to the print management service unit 50 is transferred to the document generation service unit 30. The token acquisition request includes processing information indicating contents of the processing (e.g., confirmation presence or absence information, document type information, service unit identification information, and processing type information).

The confirmation presence or absence information indicates presence or absence of a confirmation item to the print management service unit 50. The document type information is an example of target object information indicating a target object to be processed. In the present exemplary embodiment, the document type information indicates a type of a format of the document to be registered. The service unit identification information is an example of identification information capable of identifying a requesting destination of the processing and, in the present exemplary embodiment, is information capable of identifying the print management service unit 50 as the registration destination of the document. The processing type information is an example of type information indicating a type of the processing and, in the present exemplary embodiment, is information indicating that the processing of the target object performs registration of the document.

In step S1004, the document generation service unit 30 redirects the generated token acquisition request to the authentication service unit 40 via the client 12. Then, the document generation service unit 30 waits for a response to the token acquisition request.

Figure 11:
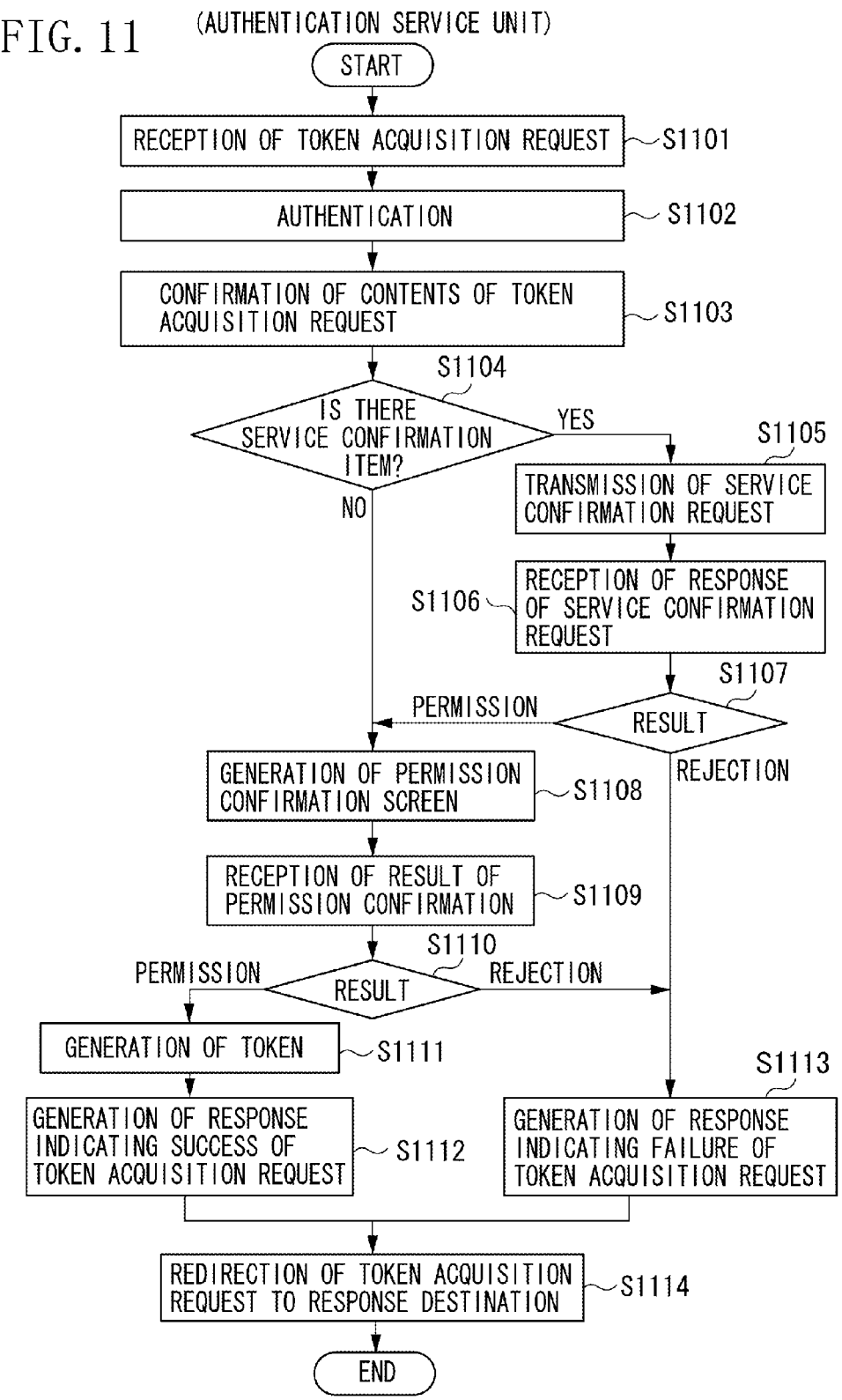
FIG. 11 illustrates an example of a flow chart of token generation processing.

When the token generation processing illustrated in FIG. 11 ends, the authentication service unit 40 redirects the response of the token acquisition request to the document generation service unit 30 via the client 12. In step S1005, the document generation service unit 30 receives the response to the token acquisition request.

In step S1006, the document generation service unit 30 determines a result of the token acquisition request. In a case where the document generation service unit 30 determines that the result of the token acquisition request is failure (i.e., NG) (NG in step S1006), the processing proceeds to step S1009. On the other hand, in a case where the document generation service unit 30 determines that the result of the token acquisition request is successful (i.e., OK) (OK in step S1006), the processing proceeds to step S1007.

In step S1007, the document generation service unit 30 transmits the document registration request to the print management service unit 50 by using a token included in the token acquisition request. The print management service unit 50 having received the document registration request confirms validity of the received token to the authentication service unit 40 according to processing (not illustrated). In a case where the print management service unit 50 determines the result to be OK, the print management service unit 50 receives the document registration, and responds to the document generation service unit 30 with the message that the document registration is successful.

On the other hand, in a case where the print management service unit 50 determines the result to be NG, the print management service unit 50 rejects the document registration and responds to the document generation service unit 30 to the extent that the document registration is unsuccessful. In step S1008, the document generation service unit 30 subsequently receives the response to the document registration request. Then, the processing proceeds to step S1009.

In step S1009, the document generation service unit 30 responds to the result of the document generation and output request. More specifically, in a case where the document generation service unit 30 determines that the result of the document generation and output request is NG, the document generation service unit 30 generates a screen indicating a failure of the document generation and output request, and transmits it to the client 12.

In a case where the document generation service unit 30 determines that the result of the document generation and output request is OK and the result of the document registration request is OK, the document generation service unit 30 generates a screen indicating a success of the document registration and transmits it to the client 12. In a case where the document generation service unit 30 determines that the result of the document generation and output request is OK but the result of the document registration request is NG, the document generation service unit 30 generates a screen indicating a failure of the document registration, and transmits it to the client 12.

FIG. 11 illustrates an example of a flow chart of the processing in a case where the authentication service unit 40 receives the token acquisition request (i.e., token generation processing).

In step S1101, the authentication service unit 40 receives the token acquisition request. In step S1102, the authentication service unit 40 subsequently performs authentication according to an authentication method of the authentication service unit 40. In step S1103, the authentication service unit 40 confirms contents of the token acquisition request.

In step S1104, the authentication service unit 40 confirms presence or absence of the confirmation item to the other service units. In a case where the authentication service unit 40 determines that the confirmation presence or absence information contained in the token acquisition request indicates "absence" (NO in step S1104), the processing proceeds to step S1108. On the other hand, in a case where the authentication service unit 40 determines that the confirmation presence or absence information contained in the token acquisition request indicates "presence" (YES in step S1104), the processing proceeds to step S1105.

In step S1105, the authentication service unit 40 transmits a service confirmation request to the service unit of the target object. More specifically, the authentication service unit 40 generates a service confirmation request including document type information and processing type information, and transmits the service confirmation request to the print management service unit 50 according to service unit identification information contained in the token acquisition request. At that time, the authentication service unit 40 adds user information authenticated in step S1102 to the service confirmation request.

In step S1106, the authentication service unit 40 receives the response of the service confirmation request. The processing in the print management service unit 50 when the service confirmation request is transmitted to the print management service unit 50 is described below in detail with reference to FIG. 12.

In step S1107, the authentication service unit 40 determines a result of the service confirmation request. In a case where the authentication service unit 40 determines that the result of the service confirmation request indicates that the processing of the target object is not received (i.e., is rejected) by the print management service unit 50 (REJECTION in step S1107), the processing proceeds to step S1113. On the other hand, in a case where the authentication service unit 40 determines the result of the service confirmation request shows that the processing of the target object is received (i.e., is permitted) by the print management service unit 50 (PERMISSION in step S1107), the processing proceeds to step S1108.

In step S1108, the authentication service unit 40 generates a permission confirmation screen for allowing the user to confirm whether to transmit the authority for performing the processing of the target object. For example, the authentication service unit 40 generates the permission confirmation screen according to contents of the response to the service confirmation request to transmit it to the client 12. FIG. 13 illustrates an example of the permission confirmation screen.

In step S1109, the authentication service unit 40 receives a result of the permission confirmation from the client 12 via the permission confirmation screen. In step S1110, the authentication service unit 40 determines the result of the permission confirmation.

At this time, in a case where the authentication service unit 40 determines that the result of the permission confirmation indicates non-permission (i.e., rejection) of the transfer of the authority for processing the target object (REJECTION in step S1110), the processing proceeds to step S1113. On the other hand, in a case where the authentication service unit 40 determines that the result of the permission confirmation indicates permission (i.e., permission) of the transfer of the authority for processing the target object (PERMISSION in step S1110), the processing proceeds to step S1111.

The authentication service unit 40 determines whether or not the authority of the user with respect to the print management server 15 is transferred to the document generation server 13. In the present exemplary embodiment, the authentication service unit 40 is not limited to the configuration for determining whether or not the authority is transferred based on the result of the permission confirmation.

For example, in a case where the authentication service unit 40 determines that the result of the service confirmation request indicates that the print management service unit 50 receives the processing of the target object, the authentication service unit 40 may be configured so as to determine the authority is to be transferred.

In step S1111, the authentication service unit 40 generates a token for certificating that the authority is transferred based on the user token information or the like. In step S1112, the authentication service unit 40 subsequently generates a request for indicating a success of the token acquisition request, and the processing proceeds to step S1114.

In step S1113, the authentication service unit 40 generates a request indicating a failure of the token acquisition request and the processing proceeds to step S1114. In step S1114, the authentication service unit 40 redirects the generated request (i.e., determined information) to a response destination (i.e., in this case, the document generation service unit 30) of the token acquisition request via the client 12.

Figure 12:
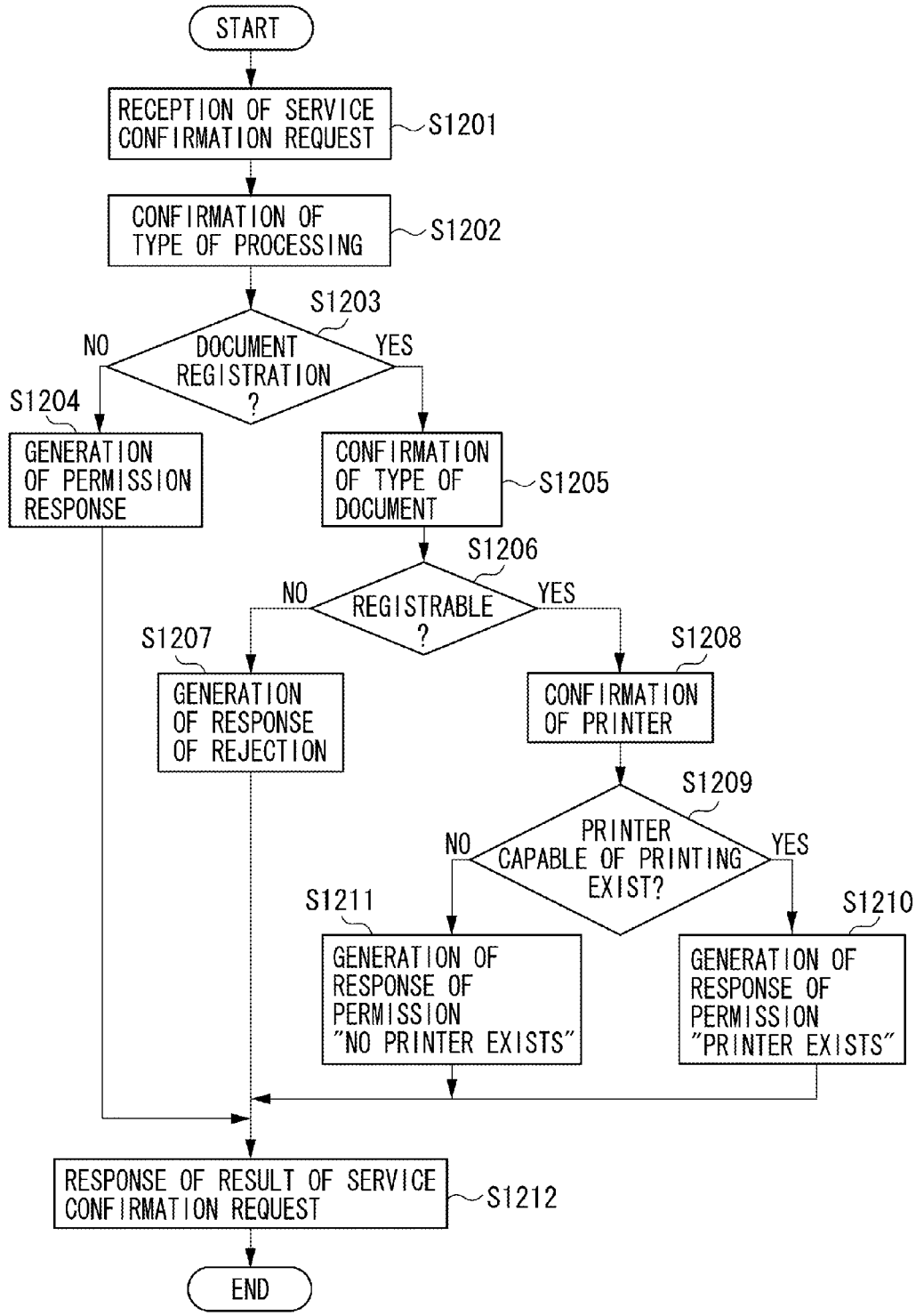
FIG. 12 illustrates an example of a flow chart of confirmation processing.

FIG. 12 illustrates an example of a flow chart of the processing (i.e., confirmation processing) in a case where the print management service unit 50 receives the service confirmation request.

In step S1201, the print management service unit 50 receives the service confirmation request. In step S1202, the print management service unit 50 confirms a type of the processing. In step S1203, in a case where the print management service unit 50 determines that the processing type information contained in the service confirmation request does not indicate the registration of the document (NO in step S1203), in step S1204, the print management service unit 50 generates a permission response as a result of the service confirmation request. Then, the processing proceeds to step S1212. On the other hand, in a case where the print management service unit 50 determines the processing type information indicates the registration of the document (YES in step S1203), the processing proceeds to step S1205.

In step S1205, the print management service unit 50 confirms the type of the document. In a case where the print management service unit 50 determines that the document type information contained in the service confirmation request is not formed in a registrable document format (NO in step S1206), the processing proceeds to step S1207. On the other hand, in a case where the print management service unit 50 determines the document type information is formed in a registrable document format (YES in step S1206), the processing proceeds to step S1208.

In step S1207, the print management service unit 50 generates a response of the rejection as a result of the service confirmation request. Then, the processing proceeds to step S1212.

In step S1208, the print management service unit 50 confirms whether there is a printer that can perform printing in the format of the document of the target object by the user corresponding to the user information contained in the service confirmation request based on the authority information.

In step S1209, in a case where the print management service unit 50 determines that there is the printer capable of printing (YES in step S1209), in step S1210, the print management service unit 50 generates a permission response with information to the extent that the printer capable of printing is registered as a result of the service confirmation request. Then, the processing proceeds to step S1212.

Figure 13A:
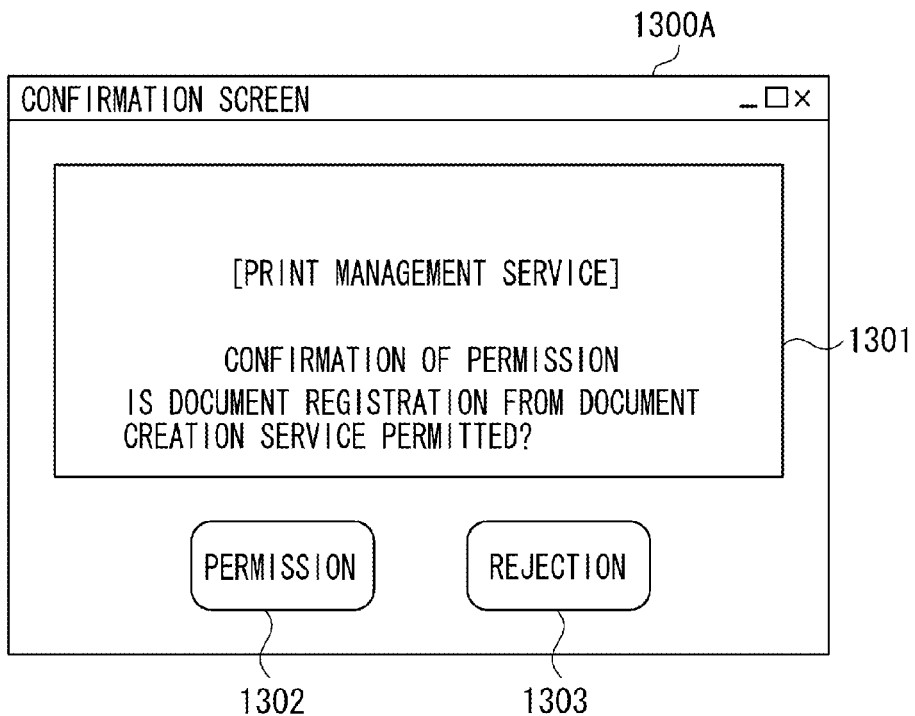
FIGS. 13A and 13B, respectively, illustrate an example of a permission confirmation screen.

In step S1108, for example, a permission confirmation screen 1300A illustrated in FIG. 13A is generated. The permission confirmation screen 1300A is an example of a screen in a case where the result of the service confirmation request indicates that "printer exists". A confirmation message column 1301 includes a message (i.e., contents) to be displayed on the client 12, and the message is generated according to the contents of the response of the service confirmation request.

Figure 13B:
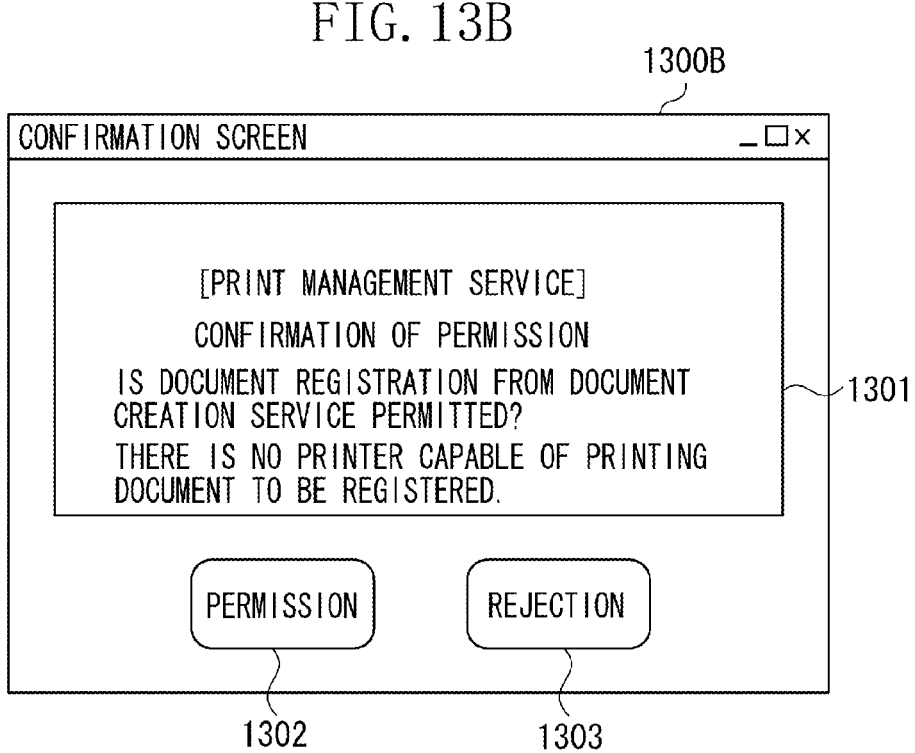

On the other hand, in a case where the print management service 50 determines there is no printable printer (NO in step S1209), in step S1211, the print management service unit 50 generates a permission response with information that the printer that can perform printing is not registered as a result of the service confirmation request. Then, the processing proceeds to step S1212. In step S1108, for example, a permission confirmation screen 1300B illustrated in FIG. 13B is generated. The permission confirmation screen 1300B is an example of a screen in a case where the result of the service confirmation request indicates that "no printer exists". In the permission confirmation screen 1300B, the confirmation message column 1301 displays that no printer that can print registrable document exists.

Each of the permission confirmation screen 1300A and the permission confirmation screen 1300B includes a permission button 1302 for permitting the transfer of the authority, and a rejection button 1303 for rejecting the transfer of the authority. In step S1212, the print management service unit 50 transmits the result of the service confirmation request, i.e., the determination information including information of the determination result, to the authentication service unit 40.

According to the above described processing, in a case where the print management service unit 50 determines that the document is formed in a unregistrable format, a screen for confirming the transfer of the authority displays the message. Therefore, in a case where the user determines that the registration of the document is useless, the user can reject the transfer of the authority.

In a case where there is no printer that can perform printing with the authority to be transferred to the user, the message indicating thereof is displayed on the screen for confirming the transfer of the authority. Therefore, in a case where the user determines that the registration of the document under the unprintable condition is useless, the transfer of the authority can be rejected.

As described above, the user can confirm whether or not the processing of the document performed with the authority to be transferred is successful before the authority is transferred, and can select the permission or the rejection of the transfer of the authority, so that the transfer of the authority can be prevented from being useless.

FIG. 14 illustrates an example of a flow chart of processing (i.e., confirmation processing) in a case where the print management service unit 50 according to a second exemplary embodiment receives the service confirmation request. With respect to the processing identical to those of FIG. 12, identical numerical numbers are attached to the corresponding processing and descriptions thereof are omitted here. Processing different from those of FIG. 12 are mainly described below.

In steps S1208 and S1209, in a case where the print management service unit 50 confirms whether there is a printer that the user corresponding to the user information can perform printing in the format of the document of the target object, and when the print management service unit 50 determines no such printer exists (NO in step S1209), the processing proceeds to step S1211. On the other hand, in a case where the printer management service unit 50 determines that such a printer exists (YES in step S1209), the processing proceeds to step S1401.

In step S1401, the print management service unit 50 acquires a list of printers printable with the format of the document of the target object. In step S1402, the print management service unit 50 subsequently generates a permission response as a result of the service confirmation request, and the acquired list of the printers is attached to the permission response. In step S1212, the result of the service confirmation request is transmitted to the authentication service unit 40.

Figure 15:
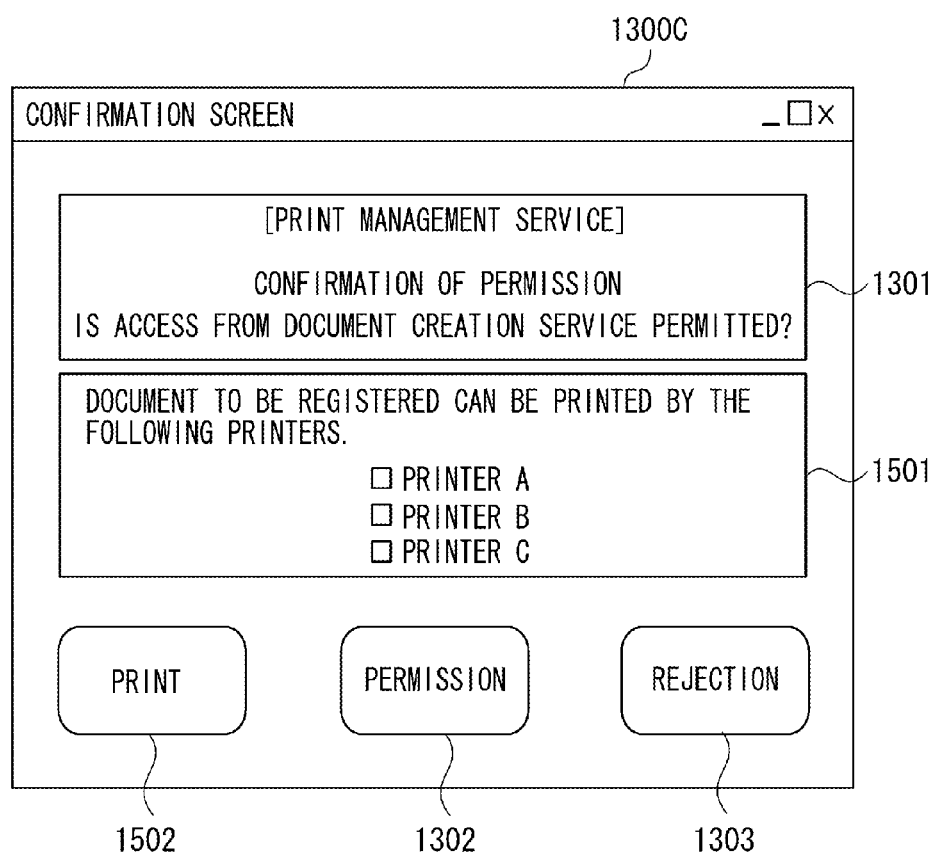
FIG. 15 illustrates an example of a permission confirmation screen.

FIG. 15 illustrates an example of a permission confirmation screen generated by the authentication service unit 40 according to the present exemplary embodiment. Configurations identical to those of FIG. 13 are given the identical numerical numbers and the descriptions thereof are omitted here. Configurations different from those of FIG. 13 are mainly described below.

A permission confirmation screen 1300C is an example of a screen generated in step S1108 in a case where the response of the service confirmation request with the list of printers generated in step S1402 of FIG. 14 being added is received in step S1106 of FIG. 11.

In the permission confirmation screen 1300C, printers capable of printing the document of the target object are listed in an additional message column 1501. The listed printers are selectable. The permission confirmation screen 1300C includes a print button 1502 for permitting the transfer of the authority and executing the printing thereof.

In a case where the print button 1502 is pressed, the authentication service unit 40 generates the token for certificating the transfer of the authority in step S1111 of FIG. 11, and assigns information for identifying the printer selected by the generated token. In step S1114, the authentication service unit 40 generates a request indicating success of the token acquisition request in step S1112 and redirects it to the response destination of the token acquisition request via the client 12.

In the document generation service unit 30, in a case where the token with information for identifying the printer being added is acquired in step S1005 of FIG. 10, the print request is executed with respect to the print management service unit 50 after the end of the processing of step S1009.

According to the above described processing, the transfer of the authority can be prevented from being useless as well as the registration and the printing of the document without the processing for receiving the print instruction from the user can be executed.

In the above described exemplary embodiments, each of the document generation service unit 30, the authentication service unit 40, and the print management service unit 50 has, but not limited to, a configuration that an independent server is used as a hosting server. For example, a configuration for hosting the above units in a single server may also be employed. Alternatively, the server clustered into a plurality of servers in order to distribute a load may be employed.

The present invention can be realized by executing the following processing. In other words, software (program) for realizing the function of the above described exemplary embodiments is supplied to the system or the apparatus via the network or various storage media and a computer (or a CPU, a micro-processing unit (MPU), and/or the like) of the system or the apparatus reads out the program to execute the processing.

According to the above described configurations of the exemplary embodiments, the transfer of the authority can be prevented from being useless as much as possible.

While the invention has been described in connection with the preferred exemplary embodiments, it is not intended to limit the scope of the invention to the particular form set forth, but, on the contrary, it is intended to cover such alternatives and modifications as may be included within the spirit and scope of the invention as defined by the appended claims Aspects of the present invention can also be realized by a computer of a system or apparatus (or devices such as a CPU, an MPU, and/or the like) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An authority transfer system comprising:
   a document generating device for providing a document generating service;
   a print management device for providing a print service that instructs a designated printer to perform print processing cooperating with the document generating service; and
   an authentication device,
   wherein the authentication device includes at least one processor coupled to at least one memory, the at least one processor being programmed to:
   receive an acquisition request to acquire a token that certifies a transfer of an authority to use the print service;
   transmit a service confirmation request from the authentication device to the print service before issuance of the token and
   provide a permission confirming screen of the transfer of an authority for allowing the authority to use the print service to be transferred to the document generating service,
   wherein the permission confirming screen is not provided in a case where an answer indicative of disapproval is received as a reply to the service confirmation request,
   wherein, in a case where an answer indicative of approval, but with a mention that no printer that is capable of printing the document generated by the document generating service exists, is received as a reply to the service confirmation request, the permission confirming screen is provided with the mention that no printer that is capable of printing the document exists,
   wherein, in a case where an answer indicative of approval with a mention that a printer that is capable of printing the document generated by the document generating service exists is received as a reply to the service confirmation request, the permission confirming screen is provided without any mention that no printer that is capable of printing the document exists, and
   wherein the token is issued in response to permission of, via the permission confirming screen, the transfer of the authority to use the print service to the document generating service, and the issued token is transmitted.

2. An authentication device capable of communication with a document generating device for providing a document generating service and a print management device for providing a print service that instructs a designated printer to perform print processing cooperating with the document generating service, the authentication device including at least one processor coupled to at least one memory, the at least one processor being programmed to:
   receive an acquisition request to acquire a token that certifies a transfer of an authority to use the print service;
   transmit a service confirmation request from the authentication device to the print service before issuance of the token and provide a permission confirming screen of the transfer of an authority for allowing the authority to use the print service to be transferred to the document generating service, wherein the permission confirming screen is not provided in a case where an answer indicative of disapproval is received as a reply to the service confirmation request, wherein, in a case where an answer indicative of approval, but with a mention that no printer that is capable of printing the document generated by the document generating service exists, is received as a reply to the service confirmation request, the permission confirming screen is provided with the mention that no printer that is capable of printing the document exists, wherein, in a case where an answer indicative of approval with a mention that a printer that is capable of printing the document generated by the document generating service exists is received as a reply to the service confirmation request, the permission confirming screen is provided without any mention that no printer that is capable of printing the document exists, and wherein the token is issued in response to permission of, via the permission confirming screen, the transfer of the authority to use the print service to the document generating service, and the issued token is transmitted.

* * * * *